(12) United States Patent
Gillespie

(10) Patent No.: US 7,401,029 B2
(45) Date of Patent: Jul. 15, 2008

(54) TOOL FOR ANALYZING CORPORATE AIRLINE BIDS

(75) Inventor: Scott Gillespie, Solon, OH (US)

(73) Assignee: TRX, Inc., Atlanta, GA (US)

( * ) Notice: Subject to any disclaimer, the term of this patent is extended or adjusted under 35 U.S.C. 154(b) by 1444 days.

(21) Appl. No.: 09/784,836

(22) Filed: Feb. 16, 2001

(65) Prior Publication Data

US 2001/0034626 A1 Oct. 25, 2001

Related U.S. Application Data

(60) Provisional application No. 60/183,066, filed on Feb. 16, 2000.

(51) Int. Cl.
*G06F 17/60* (2006.01)

(52) U.S. Cl. ............................................. 705/6; 705/1

(58) Field of Classification Search ............ 705/1, 705/13, 5
See application file for complete search history.

(56) References Cited

U.S. PATENT DOCUMENTS

| | | | |
|---|---|---|---|
| 2,910,238 A | 10/1959 | Miles et al. | |
| 2,995,729 A | 8/1961 | Steele | |
| 3,253,262 A | 5/1966 | Wilenitz et al. | |
| 4,755,963 A | 7/1988 | Denker et al. | |
| 4,775,936 A | 10/1988 | Jung | |
| 4,845,625 A | 7/1989 | Stannard | |
| 4,862,357 A | 8/1989 | Ahlstrom et al. | |
| 4,931,932 A | 6/1990 | Dalnekoff et al. | |
| 5,021,953 A | 6/1991 | Webber et al. | |
| 5,148,365 A | 9/1992 | Dembo | |
| 5,191,523 A | 3/1993 | Whitesage | |
| 5,237,499 A | 8/1993 | Gaback | |
| 5,253,165 A | 10/1993 | Leiseca et al. | |
| 5,253,166 A | 10/1993 | Dettelbach et al. | |
| 5,255,184 A | 10/1993 | Hornick et al. | |
| 5,270,921 A | 12/1993 | Hornick et al. | |
| 5,272,638 A | 12/1993 | Martin et al. | |
| 5,331,546 A | 7/1994 | Webber et al. | |
| 5,343,388 A | 8/1994 | Wedelin | |
| 5,402,336 A | 3/1995 | Spiegehoff et al. | |
| 5,570,283 A | 10/1996 | Shoolery et al. | |

(Continued)

FOREIGN PATENT DOCUMENTS

EP 0762306 12/1996

(Continued)

OTHER PUBLICATIONS

NBAA's Travel$ense Business & Commercial Aviation vol. 79, No. 2; p. 60, Aug. 1996.*

(Continued)

*Primary Examiner*—John Weiss
*Assistant Examiner*—Matthew S Meyers
(74) *Attorney, Agent, or Firm*—Harness, Dickey & Pierce, P.L.C.

(57) ABSTRACT

A airline travel supplier evaluation tool is provided which will allow companies to efficiently evaluate the value of preferred airline supplier scenarios and improve their negotiating position vis-à-vis their airline suppliers. The user of the software tool may choose which, if any, preferred supplier set is best given the user's preferences for such criteria including but not limited to saving money and/or saving travel time.

22 Claims, 5 Drawing Sheets

U.S. PATENT DOCUMENTS

| | | | |
|---|---|---|---|
| 5,623,413 A | | 4/1997 | Matheson et al. |
| 5,652,867 A * | | 7/1997 | Barlow et al. ............. 703/6 |
| 5,832,453 A | | 11/1998 | O'Brien |
| 5,850,617 A | | 12/1998 | Libby |
| 5,897,620 A * | | 4/1999 | Walker et al. ............ 705/5 |
| 6,085,169 A * | | 7/2000 | Walker et al. ............ 705/26 |
| 6,199,050 B1 * | | 3/2001 | Alaia et al. ............ 705/37 |
| 6,298,328 B1 * | | 10/2001 | Healy et al. ............ 705/10 |
| 6,336,097 B1 * | | 1/2002 | Scipioni ............ 705/6 |
| 6,381,578 B1 * | | 4/2002 | DeMarcken ............ 705/6 |
| 6,434,533 B1 * | | 8/2002 | Fitzgerald ............ 705/10 |
| 6,553,346 B1 * | | 4/2003 | Walker et al. ............ 705/1 |
| 6,609,098 B1 * | | 8/2003 | DeMarcken ............ 705/6 |
| 6,868,400 B1 * | | 3/2005 | Sundaresan et al. ............ 705/37 |
| 7,050,986 B1 * | | 5/2006 | Vance et al. ............ 705/5 |
| 2002/0161610 A1 * | | 10/2002 | Walker et al. ............ 705/5 |

FOREIGN PATENT DOCUMENTS

| | | |
|---|---|---|
| WO | WO 00/02152 | 1/2000 |
| WO | WO 01/61607 | 8/2001 |
| WO | WO 01/61607 A1 | 8/2001 |

OTHER PUBLICATIONS

P. Katz, A. Sadrian, P. Tendick, "Telephone Companies Analyze Price Quotations with Bellcore's PDSS Software", Interfaces 24: 1 Jan.-Feb. 1994 (pp. 50-63).

J. Huisingh, R. Zimmerman, "New Travel Software Saves Time, Money" http://www.dla.mil/Dimensions/Septoct99/Sep98/Sep_page_19.htm, p. 1-2.

D. A. Shepherd, "A Slam Model of Domestic Airline Passenger Fares And The Contract Air Service Program", U.S. Department of Commerce National Technical Information Service, Sep. 1986.

E.K. Clemons, M.C. Row, "Ahead of the Pakc Through Vision and Hustle: A Case Study of Information Technology at Rosenbluth Travel", 1991, IEEE, pp. 287-296.

B. Schumacher, "Proactive Flight Schedule Evaluation at Delta Air Lines", Proceedings of the 1999 Winter Simulation Conference P.A. Farrington, H.B. Nembhard, D.T. Sturrock, and G.W. Evans, eds, pp. 1232-1237.

P. Katz, A. Sadrian, P. Tendick, V. Williams, "Making the Most of a Telephone Company's Purchasing Power", Mar./Apr. 1990 pp. 23-27.

A. Sadrian, Y. S. Yoon, "A Procurement Decision Support System in Business Volume Discount Environments", vol. 42, No. 1, Jan./Feb. 1994.

A. Sadrian and Y. S. Yoon, "Busienss Volume Discount: A New Perspective on Discount Pricing Strategy", Apr. 1992, pp. 42-47.

J. V. Jucker and Meir J. Rosenblatt, "Single-Period Inventory Models with Demand Uncertainty and Quantity Discounts: Behavioral Implications and a New Solution Procedure", Naval Research Logistics Quarterly, vol. 32, pp. 537-550.

R. J. Dolan, "Quantity Discounts: Managerial Issues and Research Opportunities", Marketing Science, pp. 1-25.

Z. Drezner, G.O. Wesolowsky, "Multi-buyer Discount Pricing", European Journal of Operational Research, pp. 38-42.

H. Pirkul, O. A. Aras, "Capacitated Multiple Item Odering Problem with Quantity Discounts", Sep. 1985, IIE Transactions, pp. 206-211.

P. Katz, A. Sadrian, P. Tendick, "Telephone Companies Analyze Price Quotations with Bellcore's PDSS Software", Interfaces 24: 1 Jan./Feb. 1994, pp. 50-63.

R. Narasimhan, L. K. Stoynoff, "OPtimizing Aggregate Procurement Allocation Decisions", Journal of Purchasing Materials Management, Spring 1986, pp. 22-31.

J. C. Bean, John R. Birge, "Reducing Travelling Costs and Player Fatigue in the National Basketball Association", Interfaces, vol. 10, No. 3, Jun. 1980, pp. 98-102.

G. Francois, "Socrate: Un Projet Strategique de la SNCF au service des voyageurs", Revue Generale Des Chemins De Fer, pp. 7-9.

R. A. Russell, J. M. Y. Leung, "Devising a Cost Effective Schedule for a Baseball League", Operations Research, vol. 42, No. 4, Jul./Aug. 1994, pp. 614-625.

J.A. Ferland, C. Fleurent, "Computer Aided Scheduling for a Sport League", Infor., vol. 29, No. 1, Feb. 1991, pp. 14-25.

J.L. Huisingh, R.J. Zimmerman, "Off-site: Federal Employee Training Site Slection Software".

R.A. Russell, "Scheduling the Texas League with Multiple Objectives", 1994 Proceedings Decision Sciences Institute, 1994.

D. Bartholomew, "Cleared For Takeoff", InformationWeek, Mar. 1993, pp. 55.

M.E. Berge, C.A. Hopperstad, "Demand Driven Dispatch: a method for Dynamic Aircraft Capacity Assignment, Models and Algorithms", Operations Research, vol. 41, No. 1, Jan.-Feb. 1993, pp. 153-168.

* cited by examiner

TOOL FOR ANALYZING CORPORATE AIRLINE BIDS

CROSS-REFERENCE TO RELATED APPLICATIONS

This application claims the benefit of U.S. Provisional Application No. 60/183,066, filed on Feb. 16, 2000. The disclosure of the above application is incorporated herein by reference.

TECHNICAL FIELD

The present invention is directed to a tool for analyzing airline travel procurement options, and more particularly to a software-implemented tool for analyzing airline flight information in accordance with one or more specified scenarios of preferred airline suppliers, thereby determining the economic value of a particular scenario to an airline customer and improving a travel manager's ability to negotiate airline pricing agreements with an airline supplier.

BACKGROUND OF THE INVENTION

Airlines generally provide preferred pricing to corporate accounts in return for an expected level of revenue, segments or share of the corporation's expenditure on air travel. For example, the airline and corporation will enter into an agreement whereby the airline will provide the corporation a 10% discount on all airline tickets in return for a 35% share of the corporation's total spend on airline ticket purchases. This style of contract element is often referred to as a market share goal. Alternatively, the airline may agree to a predetermined discount if the corporation agrees to spend at least $2 million per year with the preferred airline. This style of contract element is often referred to as a revenue goal. A contract element requiring the corporation to fly a minimum number of segments in a time period is known as a segment goal.

A corporation participating in a preferred airline pricing program will typically receive a discount at the time of ticketing. For example, a $1,000 ticket will be discounted by 10% per the agreement, resulting in a $900 charge to the corporation. These discounts are known as front-end discounts, since they are given at the time of ticketing. Under a front-end discounting program, the airline must trust the corporate account to give the airline enough business to meet the revenue, segment or market share goal stated in the agreement. Alternatively, these discounts can be paid retroactively by the airline, in which case they are known as back-end discounts. Variations of these pricing agreements exist and are well known to the business travel community. Such variations include providing a flat fare for a specified city pair for a specified time period, or providing one free ticket in return for a predetermined number of purchased tickets, or payment of a predetermined amount in return for reaching a volume or market share goal. Most forms of a preferred pricing agreement can be converted to an equivalent discount; hence the term discount herein is meant to include these other forms of preferred pricing. A corporation's travel agent or travel manager is generally responsible for monitoring these agreements and reporting the corporation's compliance level to the airline. Should the corporation not meet the required goal(s), the airline typically has the right to rescind or modify the pricing agreement.

Some pricing agreements provided to a corporate airline customer can be very simple such as 15% off all fares anywhere the airline flies. However, the pricing can often be fairly complex, such as 23% off all transatlantic U.S. fares for trips that do not originate or terminate in Chicago or Dallas and are ticketed in Europe. To properly evaluate an airline's bid one must be able to apply each element of the bid to past or expected spend on the appropriate city pair, point of sale fare class and/or fare basis code, among other factors.

Typically, an airline that serves a significant portion of an account's air spend by virtue of having a hub airport near the account's primary originations and/or destinations will provide less aggressive discounts than will those airlines that would require the account's travelers to take significantly more one-stop flights. Consequently, the corporation may need to evaluate the cost of travel inconvenience associated with an airline's proposed pricing. Doing so would likely require at a minimum the comparison of the relevant airlines' flight schedule for potentially hundreds or thousands of city pairs.

It is also extremely rare for one airline to be able to serve all the destinations traveled to by a corporation's employees, so the corporation will typically negotiate pricing agreements with two or more airlines, such that most of the required destinations are covered. Those airlines which agree to provide a corporation with preferred pricing are known as preferred airlines and the corporation will instruct its employees to give these airlines preference when purchasing airline tickets.

When a corporation selects more than one preferred airline, and if the selected airlines offer significant overlapping coverage of the corporation's city pairs, the corporation will likely want to specify each airline's status among the set of preferred airlines. Note that the lack of a specified status likely implies either equal status, or the status may be obvious to those familiar with specific facts. Illustrative status levels are Primary, Co-primary, Secondary, Co-secondary, Tertiary, etc. These statuses are used to indicate to the airlines, travel agency and travelers which of the two or more competing preferred airlines should be given preference for the corporation's travel. Consequently, by designating an airline's status the corporation further influences the amount of business the airline should expect, and in turn the airline may modify its goals and discounts accordingly.

Typically, a preferred airline will include some form of goal, commensurate to some extent with the amount of business the airline expects or wishes to receive from the corporation, and which the corporation must likely meet in order to continue the benefit of the preferred pricing agreement. These goals often are such that a corporation cannot meet each preferred airline's goals, so that the corporation must choose a subset of the proposed pricing agreements, or negotiate new goals, or risk defaulting on one or more goals and thereby jeopardize one or more preferred pricing agreements.

Another problem with the evaluation of airline-nominated goals is that airlines use different methods for calculating their expected market shares at the city pair and system levels. Consequently, airlines are quite likely to disagree about what each airline's neutral (a.k.a. QSI, QSP or Fair) share is for a given city pair or a given account. Since these neutral market share estimates are the basis for most airlines' construction of pricing agreements, the differences often result in overlapping and inconsistent goals from the travel manager's perspective.

A key problem with the aforementioned business arrangement is the difficulty for a corporation to choose an appropriate set of preferred airlines. In order to make an informed decision, the travel manager should want to evaluate the expected economic value of a reasonable number of alternative sets of preferred airline suppliers using various assumptions (a set may contain one or more airlines and/or one or more assumptions). These sets are referred to as scenarios. Note that even if a travel manager could determine which set of preferred suppliers would likely cost the least, he/she may wish to consider many other factors before selecting a set of preferred airlines, including such factors as carrier reputation and quality of service, likely traveler inconvenience, other business relationships between the corporation and the airline(s), attitude and flexibility of the carrier's sales people, etc.

To illustrate the problem of making an informed economic evaluation of alternative sets of airline suppliers, suppose a corporation receives four bids on its North American travel spend. The term travel spend is herein defined as the amount of money spent annually on airline ticket purchases. The corporation has listed 200 city pairs (which are traveled between by its employees), as well as provided the number of trips and dollars spent traveling on each city pair. Airline A bids a 15% discount on all North American fares; Airline B bids a 17% discount on all North American fares, except the non-refundable fares, which it will discount 10%; Airline C bids a 10% discount on all fares anywhere in North America, unless the trips start or end in Newark, Cleveland or Houston, in which case the discounts on full fares will be 5%, and 0% for all other fares; and Airline D bids a 20% discount on all fares for travel between any city pair that does not start or end in Atlanta. If the travel does start or end in Atlanta, the discount is 12% for all fares except those in the K and L fare classes, for which the discount will be 7%.

Further, each airline has set fairly aggressive market share goals for most of the 200 city pairs. For example, for the city pair Cleveland-Atlanta, assume Airline A wants 30%, Airline B wants 45%, Airline C wants 65% and Airline D wants 70%. Consequently, many of the city pairs may have market share goals that, when added across all of the airlines, add to far more than 100%.

In the aforementioned example, the corporation's travel manager will typically want to pick the two, or possibly three airlines that will provide broad coverage of the corporation's 200 city pairs, while considering the overlap of the bidding carriers' routes, the travel inconvenience caused by taking less convenient flights, and the savings provided by the selected airlines' discount structure. The travel manager will probably not want to name all four carriers as preferred airlines because this will likely limit the travel manager's ability to concentrate travel purchases in return for better discounts, as well as limit his/her ability to deliver the market share required by each of the preferred airlines, and therefore put the corporation's discounts at risk.

Evaluating the economic value of even a small set of preferred airlines requires significant analysis. For example, even if an airline clearly offers the largest discount, it may serve only a small portion of the corporation's city pairs. Or, it may turn out that Airline A and Airline B both serve the majority of the corporation's city pairs, but overlap to a high degree, so that one airline should be chosen over the other.

Another significant consideration is the status of each preferred airline. The economic evaluation of considering Airline A as the corporation's primary preferred airline paired with Airline B as the secondary preferred airline will likely differ significantly from that found by evaluating Airline A as the primary preferred airline and paired with Airline D as the secondary preferred airline. It is apparent that there are many potential combinations of preferred airlines that a travel manager may wish to evaluate. Thus, the basic dilemmas facing a travel manager during airline negotiations are being able to 1) realistically estimate the range of business that his/her corporation can give to an airline, and 2) decide which set of preferred airlines to put under contract.

Therefore, it is desirable that the travel manager have a reasonable estimate of the range of business the corporation can provide any specific airline, together with the supporting details of city pair market shares, revenues and segments associated with each level of overall revenue. Further, it is desirable that the travel manager be able to accurately evaluate each airline's pricing proposal, as well as be informed of the incremental cost or benefit associated with any change in the travel time required to fulfill the scenario.

However, formulating these estimates depend on a number of factors in addition to the flight schedules of the airlines. Factors such as the strength of the corporation's travel policy and its enforcement, each airline's popularity with the corporation's travelers, the airline's status and the travelers' sensitivity to additional travel time should preferably be considered.

In order to rigorously prepare for negotiations with multiple airlines, a corporation would preferably assess a range of likely outcomes by articulating and testing a reasonable number of scenarios. Scenario herein means a prospective set of preferred airlines, together with assumptions about the corporation's ability to move market share to or from any specific airline. Each scenario preferably includes a viable set of preferred airlines, and together the scenarios should represent a reasonable range of preferred airline sets. The benefit of using scenario analysis is that it can reasonably quantify each airline's expected market share and revenue, which in turn can be used to assess the economic value of the scenario to the corporate airline customer. The benefit of scenario analysis to an airline is that it shows the airline the realistic range of revenue it might receive from the corporate airline customer, depending on whether the airline is selected as a preferred carrier or designated some other carrier status.

In view of the above challenges for analyzing potential airline supplier options and negotiating preferred pricing agreements, it is desirable to provide an airline travel supplier analysis system and method for associating complex sets of information necessary for assessing the economic value of a group of airline supplier scenarios. It is further desirable to provide a system and method for analyzing this information for each scenario and generating quantitative information relating to the expected travel volumes and costs of traveling in accordance with each scenario's parameters.

In view of the above, an object of the invention is to utilize the following factors to estimate an airline's scenario market share, and therefore segments and revenue, for each city pair: travel policy factor; airline sales factor; airline status factor; equipment factor and incremental travel time factor.

Another object of this invention is to provide a software tool for rapidly and rigorously calculating the economic value of an airline's current or proposed price agreement.

Another object of the invention is to provide a software tool for calculating the amount of hours spent traveling for each scenario and allow the user to take the value of this time into account when choosing a set of preferred airlines.

Another object of the invention is to provide a software tool that allows an account or airline to set one or more indexed goals that accommodate changes in the airline's flight schedules and/or the account's travel pattern.

SUMMARY OF THE INVENTION

In accordance with the teachings of the present invention, a software tool is provided which will allow companies, also referred to as accounts, to efficiently evaluate the value of preferred airline supplier scenarios and improve their negotiating position vis-à-vis their airline suppliers. The user of the software tool may choose which, if any, preferred supplier set is best given the user's preferences for such criteria including but not limited to saving money and/or saving travel time. The benefits to users of the software tool will be the ability to: 1) negotiate for more rational discounts; 2) evaluate and/or set market share goals for each preferred airline at the city pair, region and/or system level; 3) incorporate the value of the traveler's time when choosing a set of preferred airlines; 4) evaluate the set of preferred airlines supplier options from either a cost and/or travel time standpoint basis; and 5) implement contract goals that are indexed in a way to accommodate changes in airline schedules and/or the account's travel patterns. While these benefits are aimed at corporate airline customers (including their travel agents, consultants or similar third parties) which purchase significant amounts of air travel, the software tool of the present invention can also be used by the airlines to improve their ability to quickly and rationally price their bids on major accounts.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
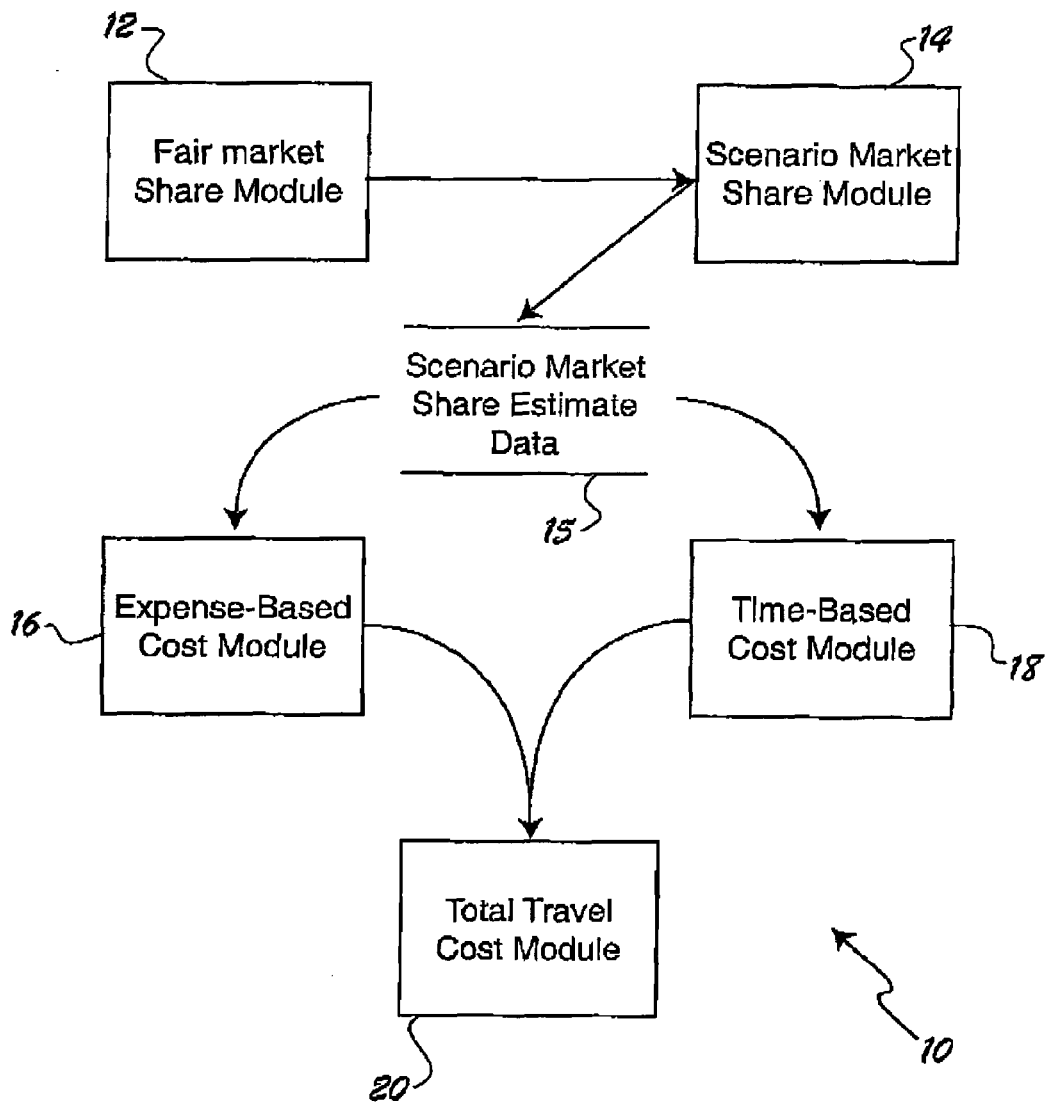
FIG. 1 is a diagram showing an overview of an airline travel supplier evaluation system in accordance with the present invention.

An overview of an exemplary airline travel supplier analysis system 10 in accordance with the present invention is illustrated in FIG. 1. The airline travel supplier analysis system 10 generally includes an airline fair market share module 12, a scenario market share module 14, an expense-based cost module 16, and a time-based cost module 18. It is to be understood that only the relevant steps associated with the system are discussed below, but that other software-implemented instructions may be needed to control and manage the overall operations of the airline travel system 10.

In general, the airline travel supplier analysis system 10 analyzes airline flight shedule and purchase information in relation to one or more predefined city pairs for a given corporate airline customer. The airline fair market share module 12 calculates each airline's fair market share for each city pair in the analysis. The output generated by the fair market share module 12 may be provided to the scenario market share calculation module 14. The scenario market share module 14 calculates each airline's expected market share of each city pair for one or more specified airline supplier scenarios. The output generated by the scenario market share module 14 is scenario market share estimate data 15. The scenario market share estimate data 15 may be provided to an expense-based cost calculation module 16 and/or a time-based cost calculation module 18. The expense-based cost module 18 calculates the amount of money the corporate customer would spend given each airline's current and/or proposed price agreements within the scenario. The time-based cost module 18 calculates the value of the total travel time required under the scenario. The output generated by either and/or both of these modules 16 and 18 may be input in a total travel cost module 20 which produces total expected cost information for each scenario.

Figure 2:
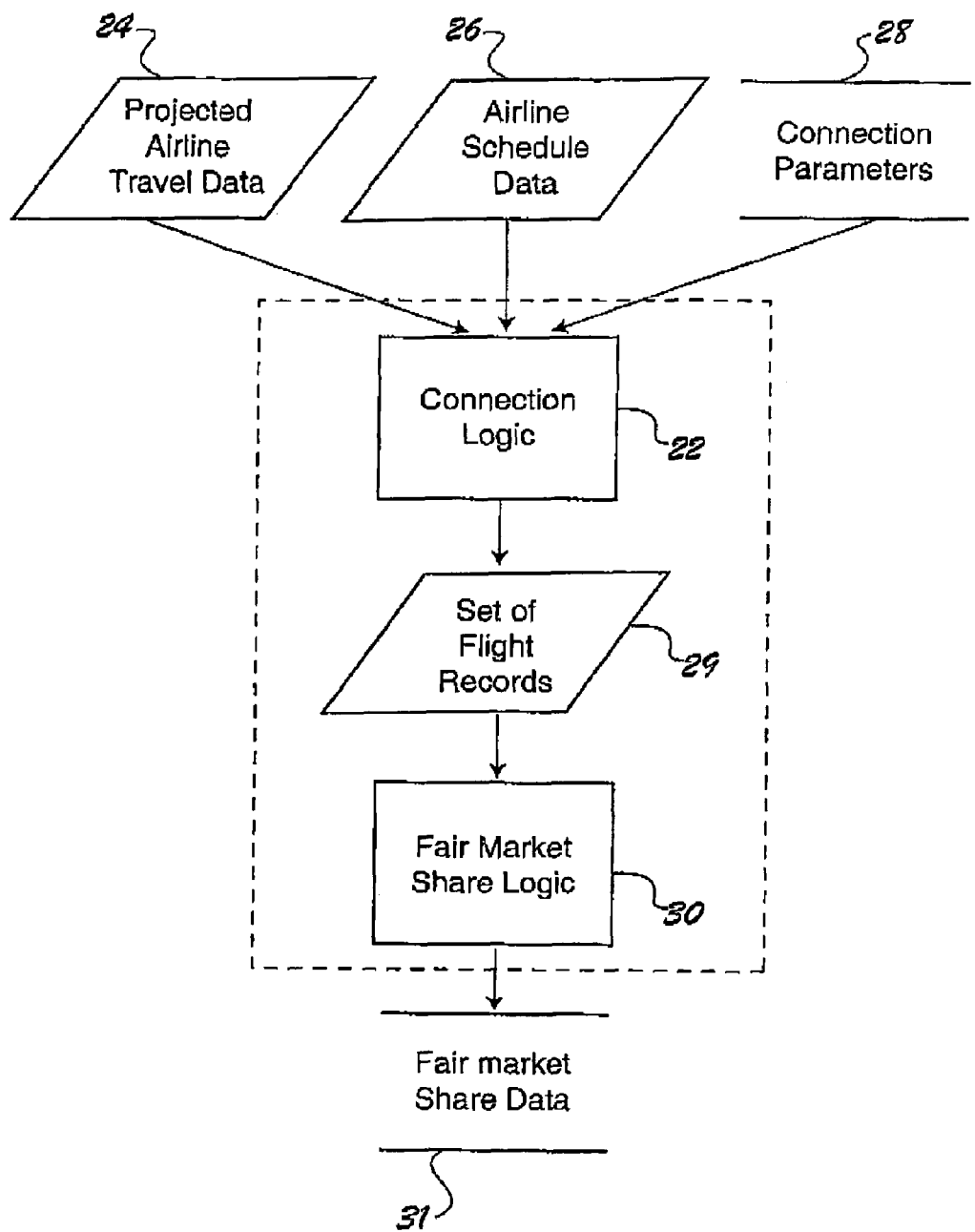
FIG. 2 is a diagram showing an overview of the fair market share module in accordance with the present invention.

An overview of the calculations performed by the airline fair market share module 12 are shown in FIG. 2. First, software-implemented connection logic 22 is used to set reasonable connection constraints and criteria as well as to build and evaluate reasonable connections for each airline considered capable of serving the city pairs that are input into the airline fair market share module 12. Although any set of one or more predefined city pairs may be input into the system, one skilled in the art will readily recognize that city pair data alternatively may be derived from recent historical airline travel information for the given airline customer. In order to build connection data for each city pair, the connection logic 22 has access to various data sources. In particular, projected airline travel data 24, airline schedule data 26 and user-defined connection parameters each serve as input to the connection logic 22.

Projected airline travel data 24 provides the expected airline travel purchases at a city pair level over a predefined time period (such as monthly or yearly) for the airline customer. In a preferred embodiment, the projected airline travel data may be derived from recent historical airline travel data over a similar time period. In this case, the projected airline travel data 24 includes records containing city pair data (in either origination-destination format or in bidirectional format); an airline identifier; the number of flights (or similar travel unit such as trips, segments or invoices) booked or purchased for the city pair; and the amount of airfare spent for the booked or purchased flights. As will be apparent to one skilled in the art, historical airline travel information may be extracted from employee expense reports, travel agent records, credit card company records, and/or other systems capable of recording travel purchase data.

The connection logic 22 also accesses airline schedule data 26 and user-defined connection parameters 28. The airline schedule data 26 is typically available from an external source such as the Official Airline Guide. As will be apparent to one skilled in the art, airline schedule data 26 specifies scheduled airline service for a plurality of airlines, including flight numbers, origination airport codes, departure times, aircraft types, destination airport codes, arrival times data, etc. The connection logic 22 determines a set of flight legs that either singularly or in combination can serve each city pair identified in projected airline travel data 24. As is known in the art, the connection logic 22 evaluates all the relevant airline flight schedule data and identifies flights that serve the city pair within the user-defined connection parameters 28. Exemplary connection parameters may include but are not limited to minimum connection times, maximum connection times, or maximum elapsed travel times which vary based on the elapsed travel time for the fastest flight serving a given city pair. Other connection parameters would preferably include logic to evaluate only online connections, and/or to limit connections to those provided by airline codeshare partners. It is envisioned that the connection parameters may be entered by a system user or system generated default values.

The output generated by the connection logic 22 is a set of flights for each city pair 29 that meet the connection parameters, and therefore are deemed to be reasonable travel options for a traveler wishing to book a flight for the city pair. For purposes of the following discussion, each flight or set of flights that serves the city pair having the same airline, departure time and arrival time is referred to as a flight record. Each flight record includes the following data fields: a flight record identifier, a city pair identifier, an airline identifier, a frequency of flights over a predefined time period (such as the number of operations per week) and additional flight schedule data for each leg of the flight record. A nonstop flight record will have one leg; whereas a one-stop flight record will have two legs. Flight schedule data for each leg includes a leg identifier, an origination airport code, a departure time, an aircraft type (e.g., 747, MD80, DC-9, etc.), a destination airport code and an arrival time.

Next, a fair market share logic 30 performs a series of calculations to determine each airline's fair market share of the customer's airline travel for each city pair. To do so, the fair market share logic 30 weights various attributes associated with each flight record in such a way as to determine a probability of a traveler to choose a flight record given all of the other flight records serving the given city pair. As will be more fully described below, fair market share estimates are based on the frequency of service for the given city pair, the aircraft type serving the city pair, and the incremental travel time of the flight record serving the city pair.

A weighting factor which correlates to the aircraft type is determined for each flight record. An exemplary weighting factor may be determined from the equipment type and equipment class as shown below:

| Equipment type | Equipment class | Equipment value |
|---|---|---|
| 747 | Wide Body Jet | 1.5 |
| 737 | Narrow Body Jet | 1.0 |
| 727 | Narrow Body Jet | 1.0 |
| ATR | Turboprop | 0.7 |

In this example, a narrow body jet serves as the baseline equipment class and therefore is assigned a weighting factor having a value of 1.0. Since a wide body jet is a larger and more preferable travel option for most travelers, it is assigned a weighting factor having a value of 1.5. In contrast, since a turboprop plane is a less desirable travel option for most travelers, it is assigned a weighting factor having a value of 0.7. This example illustrates how a weighting factor based on aircraft type can be determined for each flight record. It should be appreciated that weighting schemes could alternatively be based on the seat count for each aircraft, or on the combined types of aircraft used on multi-leg flights, or other similar methods and considerations.

Similarly, a weighting factor based on incremental travel time is determined for each flight record. Incremental travel time (ITT) is measured as the difference in minutes between the elapsed travel time (ETT) associated with a given flight record and the ETT for the flight record having the shortest amount of elapsed travel time from amongst the flight records serving a given city pair. Elapsed travel time is defined as the number of minutes between the scheduled departure time at the city pair's originating city and the scheduled arrival time at the city pair's destination city. Thus, ITT measures how much more time a particular flight record would take to get a passenger from the origination airport to the destination airport than needed by the fastest flight record serving the city pair.

An exemplary weighting factor may be determined from the ITT as shown below:

| ITT Floor | ITT Ceiling | ITT Value |
|---|---|---|
| 0 minutes | 15 minutes | 1.0 |
| 16 minutes | 30 minutes | 0.9 |
| 31 minutes | 60 minutes | 0.7 |

In this example, a range of ITT values correlates to a particular weighting factor. Flight records whose ITT falls within 0 to 15 minutes is assigned a weighting factor having a value of 1.0. Flight records whose ITT falls within 16 to 30 minutes is assigned a weighting factor having a value of 0.9. The above table can be extended up to a maximum ITT threshold time such that an ITT which exceeds the threshold time is assigned a weighting factor having a value of 0. In this way, the flight records that take longer to serve a given city pair are less favorable than flight records that take less time to serve the given city pair.

The fair market share logic 30 then uses these weighting factors to compute a "pull value" for each flight record associated with a given city pair. More specifically, the pull value for a given flight record is calculated by multiplying the number of operations over a given time period by the weighting factor for the aircraft type by the weighting factor for the ITT. For example, a flight record with seven (7) operations per week, using a narrow body jet and having an ITT of three (3) minutes would earn a pull value of 7.0 (7×1.0×1.0).

The pull values serve as the basis for an airline's fair market share estimate 31. The numerator of an airline's fair market share estimate is the sum of all of the pull values for a given city pair that are associated with a given airline; whereas the denominator is the sum of all of the pull values for all of the flight records for the given city pair for all of the airlines. In this way, fair market share estimate data is expressed in percentage form. An exemplary fair market share calculation as performed by the fair market share logic 30 is provided below:

| Airline | FR ID | Equip. | ITT Mins. | No. of Ops | Eq. Factor | ITT Factor | FR's Pull Value | Flight's Share |
|---|---|---|---|---|---|---|---|---|
| AA | 3478 | Turbo | 65 | 7 | 0.50 | 0.50 | 1.75 | 11% |
| CO | 3479 | Turbo | 32 | 6 | 0.50 | 0.70 | 2.10 | 13% |
| TW | 3480 | N-Jet | 0 | 6 | 1.00 | 1.00 | 6.00 | 38% |
| TW | 3481 | N-Jet | 32 | 6 | 1.00 | 1.00 | 6.00 | 38% |
| Totals | | | | | | | 15.85 | 100% |

Airline fair market share estimate data 31 is preferably stored in a table form and may include the following data fields: city pair, airline identifier, airline's pull value, and an airline's fair market share.

Figure 3:
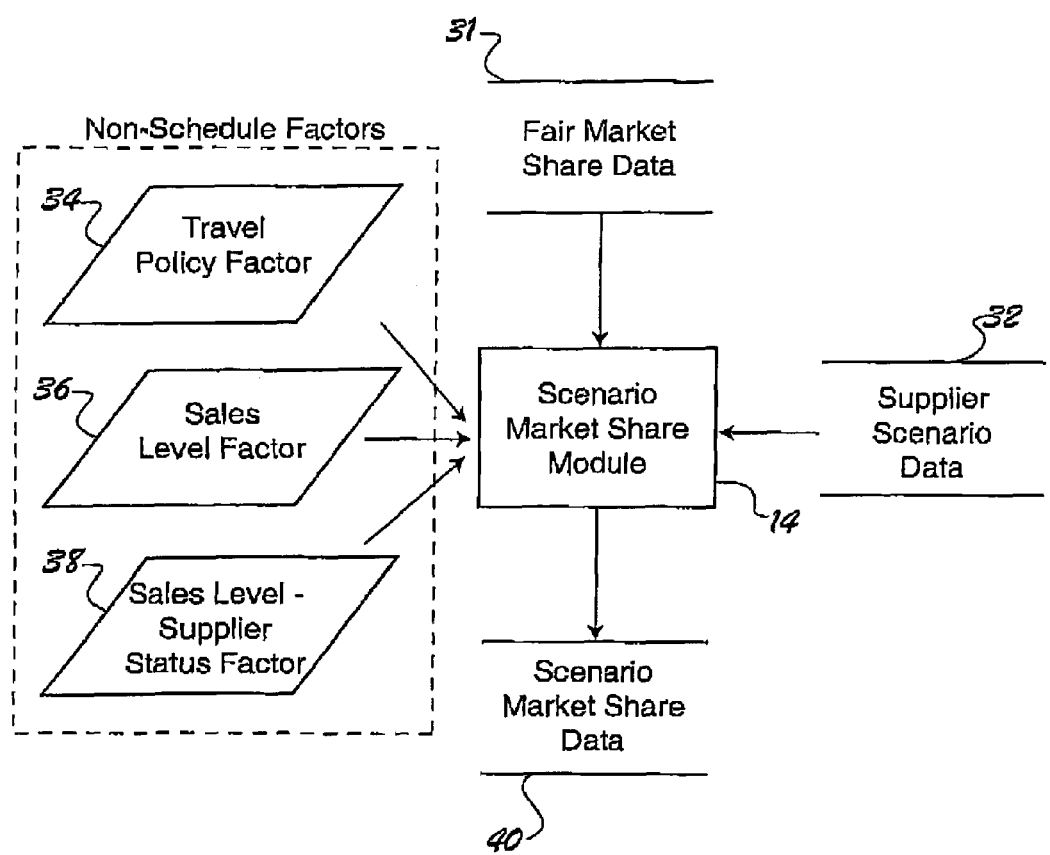
FIG. 3 is a diagram showing an overview of the scenario market share module in accordance with the present invention.

An overview of the calculations performed by the scenario market share module 14 are discussed in relation to FIG. 3. The scenario market share module 14 calculates each airline's expected market share of each city pair for one or more specified airline supplier scenarios. Thus, a specified airline supplier scenario must first be established by a system user or defaulted by the system.

An airline supplier scenario involves assigning a supplier status to each of the plurality of airlines that may be used by the airline customer. The supplier status is indicative of an airline customer's preference for having its travelers use the particular airline. The airline supplier status can take many forms but should preferably be monotonic (e.g., primary, co-primary, secondary or some equivalent hierarchy). For instance, a specified airline supplier scenario may designate Airline A as the preferred primary airline, Airline B as the preferred secondary airline and Airline C as the preferred tertiary airline. As will be apparent to one skilled in the art, supplier status serves as a technique for prioritizing potential allocation of market share amongst various airlines. By varying the assignment of the supplier status for different airlines, a system user may establish more than one scenario 32 which will serve as input to the scenario market share module 14. It should also be appreciated that other factors may be used to establish different scenarios.

For each specified airline supplier scenario, the scenario market share module 14 calculates each airline's expected market share at the city pair level based on various non-schedule based factors. In a preferred embodiment of the present invention, the scenario market share module 14 uses three such non-schedule based factors: a travel policy factor 34, an airline sales level factor 36, and a sales level-supplier status factor 38.

The travel policy factor is indicative of an airline customer's ability to shift travel purchases to its preferred airline suppliers. The value of the travel policy factor should correlate to the strength of the customer's ability to shift travelers to its preferred airline suppliers. For example, a travel factor value of 1.0 would mean the customer has no influence over its travelers' choice of airlines. On the other hand, a travel factor value of 2.0 would indicate the customer believes it has a fair amount of influence over its travelers' airline choices, and a travel factor value of 3.0 would mean the customer has even more influence than a travel factor value of 2.0. It is envisioned that the system can accept user-defined travel policy factors or store default values, preferably in the following form:

| Travel Policy Level | Travel Policy Factor |
|---|---|
| Very Strong | 2.0 |
| Strong | 1.8 |

One skilled in the art will recognize that by adding a scenario identifier to this table would facilitate the system storing and applying different travel policy factors to different scenarios.

The airline sales level factor preferably correlates the airline's ability to attract additional travel volumes from the account based on non-schedule factors. The airline sales level factor will preferably depend on the customer's assessment of the airline's ability to attract the customer's travelers to the airline's flights beyond what the airline expects based on the schedule based factors. As will be apparent to one skilled in the art, elements affecting the sales level factor include the airline's willingness to support the customer with benefits, such as free upgrades, free tickets, seat list clearance, soft dollars, etc. Additionally, the customer may consider the airline's general pricing (e.g., low-cost vs. full service), reputation for safety, on-time performance, and other such elements. It is envisioned that the system can accept user-defined sales level factors or store default values, preferably in the following form:

| Specified Airline Code | Sales Level |
|---|---|
| AA | Very Strong (Level 8) |
| CO | Strong (Level 7) |

One skilled in the art will recognize that it is also possible to assign a sales level factor to represent an unpopular airline and its likely inability to attract even its schedule-based market share.

The sales level-supplier status factor is a combination of the supplier status and the above-described airline sales level factor. In other words, the sales level assigned to a particular airline may vary based on the airlines supplier status level. The sales level-supplier status factor should be consistent with the principles that a) the higher an airline's sales level factor, the more market share it should expect to receive, and b) the higher the airline's supplier status, the more market share it should expect to receive. Exemplary values for the sales level-supplier status factor are shown below:

| Sales Level | Sales Level Description | Sales Factor if Status is Primary | Sales Factor if Status is Co-Primary | Sales Factor if Status is Secondary |
|---|---|---|---|---|
| 8 | Very Strong | 2.0 | 1.9 | 1.8 |
| 7 | Strong | 1.9 | 1.8 | 1.7 |
| 6 | Very Good | 1.8 | 1.7 | 1.6 |

Each of these non-schedule based factors are then used to derive scenario market share data 40 for each airline.

In a preferred embodiment of the present invention, scenario market share data 40 may be derived as follows. The fair market share data 31 for each airline serving the given city pair is input to and/or retrieved from an accessible memory space by the scenario market share module 14. To facilitate computations, the fair market share percentages may be converted to whole numbers by multiplying the percentage by a factor of 100, thereby resulting in fair market share points as shown in the table below.

Next, one or more of the non-schedule based factors are applied to the fair market share data. For instance, a combination of the travel policy factor and the sales level-supplier status may be applied to the fair market share data. In this instance, the travel policy factor and the sales level-supplier status factor are first retrieved from an accessible storage area based on the airline identifier associated with a particular airline's fair market share data. The supplier status for a given airline must be determined in order to retrieve the appropriate sales level-supplier status factor.

The travel policy factor and the sales level-supplier status factor are then combined using mathematical operations that abide by two requirements: (1) when holding the travel policy factor value constant and increasing the value of the sales level-supplier status factor, the resulting combined value has a greater absolute value than either of the travel policy factor or the sales level-supplier status factor alone; and (2) when holding the sales level-supplier status factor value constant and increasing the value of the travel policy factor, the resulting combined value is greater absolute value than either of the travel policy factor or the sales level-supplier status factor alone. In a preferred embodiment, the travel policy factor is multiplied by the sales level-supplier status factor. However, it is envisioned that the two factors may also be combined by addition, squaring, other mathematical operations or combinations thereof.

The fair market share data for the airline(s) with the highest ranking status among those serving the city pair is then multiplied by the combined factors value to obtain a scenario market share value. In the preferred embodiment, the fair market share values for the remaining airlines serving the city pair are unchanged, although it is recognized that these fair market share values could similarly be transformed consistent with the principles of the present invention. The resulting scenario market share values and fair market share values may be expressed in percentage form. To do so, the scenario market share values and fair market share values for each of the airlines at the city pair level are summed within a given scenario. The scenario market share value or fair market share value for a given airline is then divided by the sum of scenario m arket share values and fair market share values, thereby deriving an airline's scenario market share for the given city pair within the given scenario. This preferred method for deriving scenario market share data is further illustrated in the table below:

airlines in some proportion to the value of the travel policy factor; (c) the projected market shares are consistent with the desire of the customer who wishes to prioritize certain preferred airlines over other preferred and non-preferred airlines; and (d) the projected market shares are consistent with the customer's assumptions about each airline's ability to attract additional travel based on the airline's non-schedule factors and attributes. While the above description has been provided with reference to a particular computational approach, it should be appreciated that variations for deriving scenario market share data from the fair market share data are within the broader aspects of the present invention.

Figure 4:
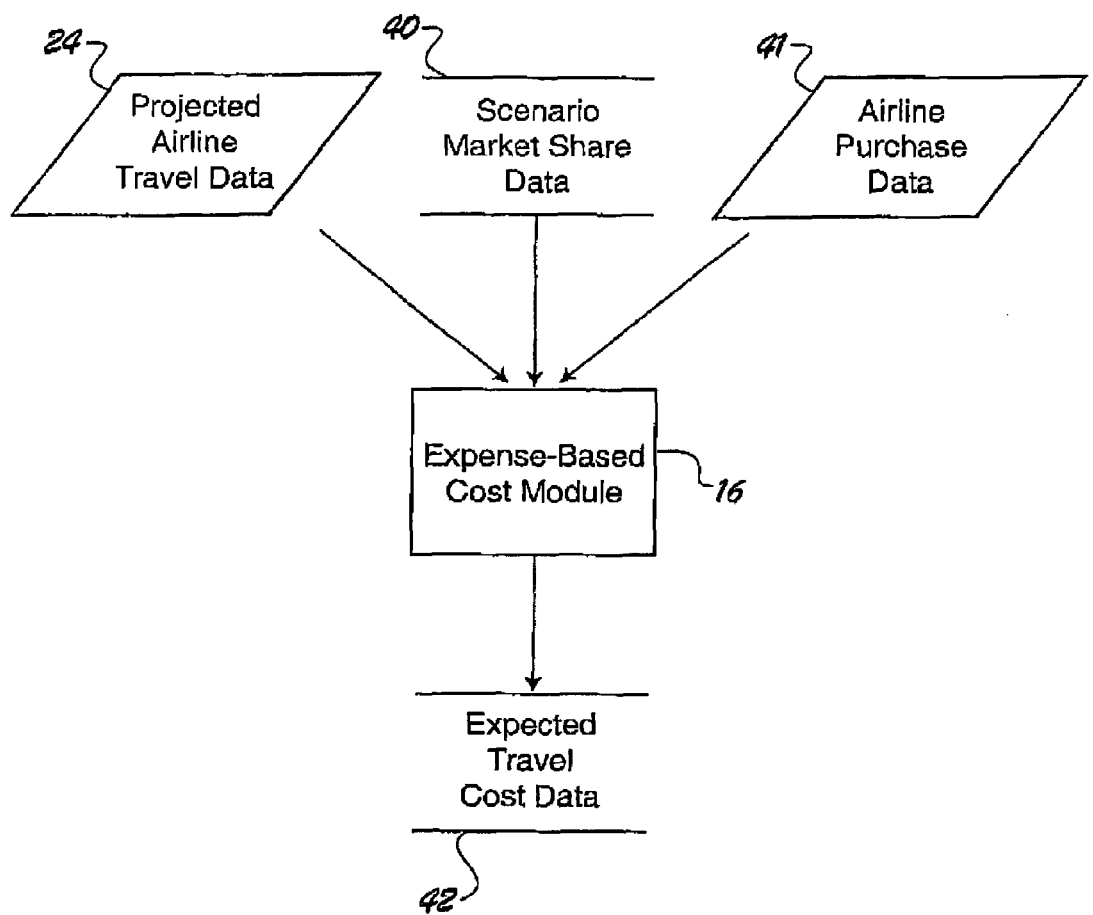
FIG. 4 is a diagram showing an overview of the expense-based cost module in accordance with the present invention.

The scenario market share estimate data 40 may in turn serve as input to the expense-based cost calculation module 16 and/or the time-based cost calculation module 18. Referring to FIG. 4, the expense-based cost module 16 calculates the amount of money the corporate customer would spend given each airline's current and/or proposed price agreements within a given scenario. In addition to scenario market share data, the expense-based cost module 16 accesses projected airline travel data 24 and airline purchase data 41. Airline purchase data may include the terms and conditions of any recent and/or prospective price agreement, the estimated or actual fare mix as purchased by the corporate airline customer, and/or the estimated or actual source country (a.k.a. point of sale) of the customer's airline purchases for each given airline. Given an airline's fair market share and/or scenario market share for a given city pair, the customer's projected airline travel for the city pair, and the relevant airline purchase data, the expense-based cost module 16 can compute the expected travel cost data as is known in the art. It is envisioned that the expected travel cost data may or may not account for any special pricing provided for under an airline's

| City Pair | Carrier Code | Fair Market Share | Carrier's FMS Points | Scenario ID | Travel Policy Factor | Sales-Status Factor | Carrier's Scenario Points | Carrier's Scenario Share |
|---|---|---|---|---|---|---|---|---|
| CLEORD | AA | 25% | 25 | 2 | 1.5 | 1.4 | 52.5 | 29.9% |
| CLEORD | CO | 35% | 35 | 2 | 1.5 | 1.2 | 63 | 35.9% |
| CLEORD | UA | 40% | 40 | 2 | 1.5 | 1 | 60 | 34.2% |
| | | | | | | | 175.5 | |
| CLEORD | AA | 25% | 25 | 3 | 1.5 | 1.2 | 45 | 22.6% |
| CLEORD | CO | 35% | 35 | 3 | 1.5 | 1 | 52.5 | 26.3% |
| CLEORD | UA | 40% | 40 | 3 | 1.5 | 1.7 | 102 | 51.1% |
| | | | | | | | 199.5 | |

The resulting scenario market share data 40 can be stored in table form, and preferably includes a scenario identifier, an city pair identifier, an airline code, the airline's expected scenario share of the city pair's trips, and the airline's expected scenario number of trips on the city pair. It is further envisioned that the system may aggregate and store the number of each airline's expected trips for each city pair to derive regional and/or account-wide scenario totals for each airline.

One skilled in the art will readily recognize that the above-described computation technique has the advantages of allocating a city pair's share between the airlines serving the city pair such that: (a) when summed across all airlines at the city pair-scenario level the expected scenario shares add to 100%, thereby eliminating overlapping market share estimates as may be provided by the airlines; (b) it uses a mathematically consistent methods for modeling the customer's strength of travel policy by changing the share awarded to the preferred current or proposed contract terms. In addition, the airline's expected spend and segments at the city pair level can be aggregated at a regional or system-wide level.

Figure 5:
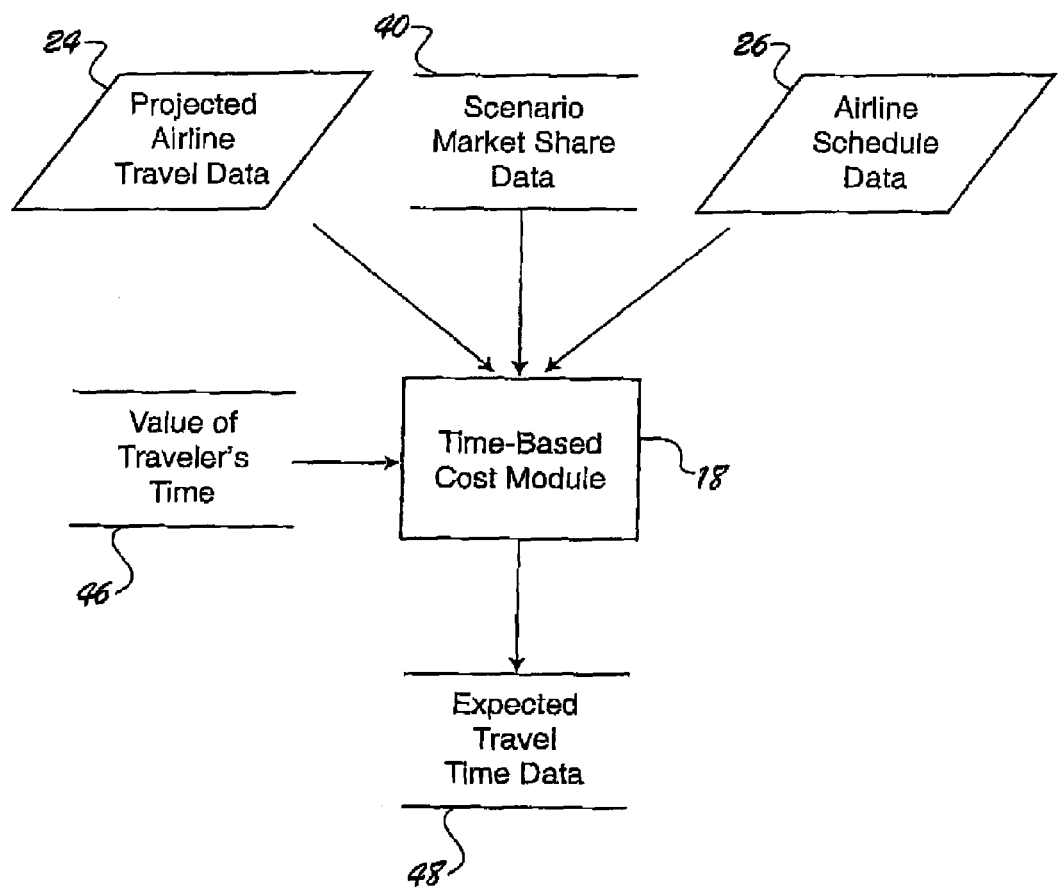
FIG. 5 is a diagram showing an overview of the time-based cost module in accordance with the present invention.

With reference to FIG. 5, the time-based cost module 18 calculates the value of the travel time required under a given scenario. The scenario market share data, the projected airline travel data, and airline schedule data also serve as inputs to the time-based cost module 18. As will be apparent to one skilled in the art, the time-based cost module 18 can calculate the expected travel time on a given airline for a given city pair by using each of these three input data sets. A preferred method for deriving the expected travel time for a scenario is to first find each airline's fastest flight record for each city pair from those provided in the airline schedule data 26. For the given scenario, multiply the airline's expected number of segments as given by the scenario market share data 40 by the amount of time associated with the airline's fastest flight record serving the city pair. Sum the amount of time for each airline across all city pairs within the scenario. It is envisioned that other methods may used for estimating the amount of time associated with each airline's ability to serve a given city pair, such as a weighted average based on each flight record's probability of being used by a business traveler.

In addition, the system user preferably enters a number representing the estimated value of the customer's average traveler's time 46. In a preferred embodiment, this number is expressed in a currency unit per hour format. By multiplying the expected travel time by the value of the traveler's time, the time-based cost module can determine expected travel time cost data 48. The results from the time-based cost module 18 may be stored in the following form:

| Scenario ID | City Pair Code | Carrier Code | Expected Travel Time (hours) | Expected Travel Cost |
|---|---|---|---|---|
| 2 | CLEORD | AA | 420 | $42,000 |
| 3 | CLEORD | AA | 350 | $35,000 |

The expected travel time cost data 48 may be aggregated to provide the expected travel time cost for a specified scenario. In this way, the incremental cost of travel time for one scenario can be compared with the travel time for other scenarios. It should be appreciated that by setting the value of the average traveler's time to zero, the time-based cost data can be eliminated from the airline customer's analysis.

Lastly, a total cost module 20 may be used to generate a total expected travel cost for each scenario. The expected travel expense data from the expense-based cost module 16 is combined with the expected travel time cost data from the time-based cost module 18 to derive a total expected cost for a given scenario. Each scenario's total expected cost may preferably be compared to a baseline amount to determine the relative economic value of each scenario. In one preferred embodiment, the baseline amount is deemed to be the previous historical travel data for the airline customer. Another baseline form could be the scenario's expected cost using the scenario's same projected market share and segments in the baseline as in the prospective scenario but using the account's recent negotiated pricing agreements to derive the scenario's baseline cost, while using the prospective pricing agreements associated with the scenario prospective cost of the scenario. An illustrative form for reporting the results are shown below:

| Scenario Description | Scen. ID | Scenario's Total Cost | Scenario's Projected Savings |
|---|---|---|---|
| UA Primary, DL Co-Primary, CO Secondary | 8 | $21,363,796 | $543,765 |
| UA Primary, NW Co-Primary, AA Secondary | 9 | $21,214,424 | $1,289,332 |
| AA Primary, UA Co-Primary, BA Secondary | 10 | $22,721,340 | $(307,284) |

In another aspect of the present invention, the fair market share estimate data and/or the scenario market share data may be used as the basis for a pricing agreement between the airline customer and a given airline. In a typical situation, any discount pricing or pricing arrangement agreed upon with an airline is tied to an expected volume of the customer's airline travel that will utilize the given airline. In a preferred embodiment of the present invention, the above-described fair market share data, the scenario market share data or a combination thereof are used as the basis for the expected travel volume. As will be apparent to one skilled in the art, the expected volumes and therefore the corresponding market share data may be specified at a city pair, regional, or account level.

To allow for some deviation in travel volumes, an indexed market share multiplier may be applied to either the fair market share data and/or the scenario market share data which serves as the basis for the agreement. For instance, an indexed market share multiplier of 10% allows for the volume of customer's airline travel to fall within a range of deviation from the market share value.

Since fair market share data and scenario market share data inherently account for changes in airline service to a given city pair, the use of fair market share data and/or scenario market share data as the basis of a pricing agreement alleviates the problem of having to renegotiate a market share goal each time an airline significantly changes its flight schedule or whenever the airline customer significantly changes its travel patterns. Rather, the travel manager or the airline can at periodic intervals during or at the end of the agreement determine the market share data for a given airline, and thereby assess the pricing agreement.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An airline travel supplier evaluation system for analyzing airline flight information in relation to one or more predefined city pairs for a given airline customer, comprising:
   a source of airline schedule data from a plurality of airlines for a plurality of city pairs;
   a memory space for storing the airline schedule data and the city pairs;
   an airline fair marketshare module that accesses the airline schedule data and the city pairs and calculates an incremental travel time for each flight record serving a given city pair in relation to the fastest flight serving the given city pair, the airline fair market share module determines a market share for each airline in relation to a given city pair over a period of time and adjusts the market share for each airline based on the incremental travel time associated with flight records serving the given city pair, thereby determining a fair market share for each airline in relation to a given city pair.

2. The airline travel supplier evaluation system of claim 1 wherein the airline fair marketshare module computes an elapsed time for each flight record serving a given city pair using the flight schedule data, identifies a baseline flight record, the baseline flight record having the shortest elapsed travel time from amongst the flight records serving the given city pair; and computes the incremental travel time for each flight record serving the given city pair, where the incremental travel time is the difference between the elapsed travel time of a given flight record and the elapsed travel time for the baseline flight record.

3. The airline travel supplier evaluation system of claim 1 wherein the airline schedule data further includes aircraft type data for each flight record serving the predefined city pairs, and where the fair market share for a given airline is based on the frequency of operations in the flight records associated with given airline, the aircraft type for each flight record associated with given airline, and the incremental travel time for each flight record associated with the given airline.

4. The airline travel supplier evaluation system of claim 1 further comprises a scenario marketshare module that receives non-schedule based factors and adjusts the fair market share for a given airline based on the non-schedule based factors to determine scenario market share data for each airline in relation to the predefined city pairs, wherein the non-schedule based factors is at least one of a travel policy factor, the travel policy factor being indicative of the airline customer's ability to shift travelers towards or away from any given airline, a sales level factor, the sales level factor being indicative of an airline's ability to attract the travelers of the given airline customer to the airline, a supplier status indicative of an airline customer's preference to have its travelers use the airline is assigned to one or more of the plurality of airlines, or a sales level-supplier status factor is based on the supplier status and a corresponding sales level factor.

5. The airline travel supplier evaluation system of claim 1 further comprising a source of projected airline travel data over a predefined time period for the given airline customer; a source of airline purchase data; and an expense-based cost module that accesses the projected airline travel data and the airline purchase data, and determines expected travel expense data for the given airline customer based on the scenario market share data.

6. The airline travel supplier evaluation system of claim 5 further comprising a source of pricing data relating to an agreement between the given airline customer and at least one airline, wherein the expense-based cost module determines expected travel expense data based in part on the pricing data.

7. The airline travel supplier evaluation system of claim 1 further comprising a source of projected airline travel data over a predefined time period for the given airline customer; and a time-based cost module that accesses the projected airline travel data, the airline schedule data and the scenario market share data; and determines expected travel time for the given airline customer based on the scenario market share data, the time-based cost module further receive a value for a traveler's time and determines expected travel time cost data based on the traveler's time value data and the expected travel time for the given airline customer.

8. A computer-implemented method for determining a fair market share for a given airline in relation to a given city pair, comprising:
providing airline schedule data for each flight serving the given city pair, the airline schedule data including aircraft type data;
determining an incremental travel time for each flight serving the city pair using the airline schedule data;
determining a market share for a given airline in relation to the given city pair over a period of time; and
adjusting the market share for the given airline by executing a software-implemented application on a computing device and based on the frequency of flights serving the given city for the given airline, the aircraft type for each flight associated with the given airline, and the incremental travel time of each flight associated with the given airline.

9. The computer-implemented method of claim 8 wherein the airline schedule data further defined as a plurality of flight records for the given city pair, such that each flight record is indicative of one or more flights that serve the given city pair and include a record identifier, an airline identifier, a frequency of the flights over a predefined time period, and detail flight schedule data for each flight comprising the flight record.

10. The computer-implemented method of claim 9 wherein the step of determining incremental travel time further comprises the steps of:
computing an elapsed travel time for each flight record;
identifying a baseline flight record, the baseline flight record having the shortest elapsed travel time from amongst the flight records serving the given city pair; and
computing an incremental travel time for each flight record, where the incremental travel time is the difference between the elapsed travel time of a given flight record and the elapsed travel time for the baseline flight record.

11. The computer-implemented method of claim 10 wherein the step of adjusting a market share further comprises the steps of:
determining an aircraft type weighting factor for each flight record;
determining an incremental travel time weighting factor for each flight record;
determining a pull value for each flight record, where the pull value is computed by multiplying the frequency associated with the flight record with the aircraft type weighting factor and with the incremental travel time weighting factor; and
determining a ratio between a sum of the pull values for each of the flight records associated with the given airline and a total sum of the pull values for the plurality of flight records, thereby yielding the fair market share for the given airline.

12. A computer-implemented method for determining a fair market share for a given airline in relation to a given city pair, comprising:
providing airline schedule data for a plurality of airlines, the airline schedule data including a set of flights which correspond to the given city pair and each flight having an elapsed travel time;
identifying a baseline flight, the baseline flight having the shortest elapsed travel time from amongst the set of flights;
computing an incremental travel time for each flight in the set of flights, where the incremental travel time is the difference between the elapsed travel time of a flight and the elapsed travel time for the baseline flight;
determining a market share for a given airline from the plurality of airlines in relation to the given city pair over a period of time; and
adjusting the market share for the given airline based in part on the incremental travel time of each flight associated with the given airline by executing a software-implemented application on a computing device.

13. The computer-implemented method of claim 12 wherein the set of flights are grouped into a plurality of flight records, such that each flight record is indicative of one or more flights that serve the given city pair and include a record identifier, an airline identifier, a frequency of the flights over a predefined time period, and detail flight schedule data for each flight comprising the flight record.

14. The computer-implemented method of claim 13 wherein the step of determining a fair market share further comprises the steps of:
   determining an aircraft type weighting factor for each flight record;
   determining an incremental travel time weighting factor for each flight record;
   determining a pull value for each flight record, where the pull value is computed by multiplying the frequency associated with the flight record with the aircraft type weighting factor and with the incremental travel time weighting factor; and
   determining a ratio between a sum of the pull values for each of the flight records associated with the given airline and a total sum of the pull values for the plurality of flight records, thereby yielding the fair market share for the given airline.

15. A computer-implemented method for determining a scenario market share for a given city pair for a given airline selected from a plurality of airlines, comprising:
   determining a market share for the given airline in relation to the given city pair over a given period of time, such that the market share is based on schedule-based factors associated with the flights serving the given city pair;
   determining a travel policy factor for a given airline customer, the travel policy factor being indicative of the given airline customer's ability to shift travelers towards or away from any given airline; and
   adjusting the market share for the given airline based on the travel policy factor and by executing a software-implemented application on a computing device.

16. The computer-implemented method of claim 15 further comprises the steps of:
   determining a second travel policy factor for the given airline customer; and
   deriving the scenario market share for the given airline in relation to the given city pair from the fair market share for the given airline in part based on the second travel policy factor.

17. The computer-implemented method of claim 15 further comprising the step of determining a sales level factor for one or more of the plurality of airlines, the sales level factor being indicative of an airline's ability to attract the travelers of an airline customer to the airline, such that the scenario market share for the given airline is in part based on the sales level factor associated with the given airline.

18. The computer-implemented method of claim 16 further comprising the steps of:
   assigning a supplier status for one or more of the plurality of airlines, the supplier status being indicative of an airline customer's preference of having its travelers use the airline; and
   determining a sales level-supplier status factor for the given airline, where the sales level-supplier status factor is based on the supplier status and the corresponding sales level factor for the given airlines, such that the scenario market share for the given airline is in part based on the sales level-supplier status factor associated with the given airline.

19. A computer-implemented method for determining a scenario market share for a given airline selected from a plurality of airlines, comprising:
   determining a market share for the given airline in relation to a given city pair over a period of time, such that the market share is based on schedule-based factors associated with the flights serving the given city pair;
   determining a sales level factor for one or more of the plurality of airlines, the sales level factor being indicative of an airline's ability to shift the travelers of an airline customer to the airline; and
   adjusting the market share for the given airline based on the sales level factor associated with the given airline and by executing a software-implemented application on a computing device.

20. The computer-implemented method of claim 19 further comprising the steps of:
   determining a second sales level factor for each of the plurality of airlines; and
   determining the scenario market share for the given airline by adjusting the fair market share for the given airline in part based on the second sales level factor associated with the given airline.

21. The computer-implemented method of claim 19 further comprising the steps of:
   assigning a supplier status for each of the plurality of airlines, the supplier status being indicative of an airline customer's preference of having its travelers use the airline;
   determining a sales level-supplier status factor for the given airline, where the sales level-supplier status factor is based on the supplier status and the corresponding sales level factor for the given airline; and
   deriving the scenario market share for the given airline from the fair market share for the given airline in part based on the sales level-supplier status factor associated with the given airline.

22. The computer-implemented method of claim 19 further comprising the step of determining a travel policy factor for a given airline customer, the travel policy factor being indicative of an airline customer's ability to shift travelers towards or away from any given airline, where the scenario market share for the given airline is in part based on the travel policy factor.

* * * * *